(12) United States Patent
Harris

(10) Patent No.: US 8,352,352 B2
(45) Date of Patent: Jan. 8, 2013

(54) WEB BASED COMMUNICATION OF INFORMATION WITH RECONFIGURABLE FORMAT

(75) Inventor: Scott C. Harris, San Diego, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 3407 days.

(21) Appl. No.: 10/064,439

(22) Filed: Jul. 14, 2002

(65) Prior Publication Data
US 2009/0099938 A1    Apr. 16, 2009

Related U.S. Application Data

(63) Continuation of application No. 09/682,853, filed on Oct. 24, 2001.

(51) Int. Cl.
*G06Q 40/00* (2006.01)
(52) U.S. Cl. .......................................................... 705/37
(58) Field of Classification Search .................... 705/35, 705/37
See application file for complete search history.

(56) References Cited

U.S. PATENT DOCUMENTS

| | | | |
|---|---|---|---|
| 5,826,241 A | 10/1998 | Stein et al. | |
| 5,835,896 A * | 11/1998 | Fisher et al. | 705/37 |
| 5,920,847 A | 7/1999 | Kolling et al. | |
| 6,012,045 A | 1/2000 | Barzilai et al. | |
| 6,064,990 A | 5/2000 | Goldsmith | |
| 6,185,542 B1 | 2/2001 | Moran et al. | |
| 6,363,414 B1 | 3/2002 | Nicholls et al. | |
| 6,366,891 B1 * | 4/2002 | Feinberg | 705/37 |
| 6,405,204 B1 | 6/2002 | Baker et al. | |
| 6,408,282 B1 | 6/2002 | Buist | |
| 6,438,578 B1 | 8/2002 | Schmid et al. | |
| 6,480,711 B1 | 11/2002 | Schroeder et al. | |
| 6,933,910 B2 | 8/2005 | Rajan et al. | |
| 7,058,582 B2 * | 6/2006 | Powell | 705/1 |
| 7,505,935 B2 * | 3/2009 | Mendiola et al. | 705/37 |
| 2001/0056395 A1 * | 12/2001 | Khan | 705/37 |
| 2002/0026396 A1 | 2/2002 | Dent et al. | |
| 2002/0029183 A1 | 3/2002 | Vlahoplus et al. | |
| 2002/0032641 A1 * | 3/2002 | Mendiola et al. | 705/37 |
| 2002/0065693 A1 | 5/2002 | Hattori et al. | |
| 2002/0068991 A1 | 6/2002 | Fitzsimmons | |
| 2002/0069253 A1 | 6/2002 | Kazui et al. | |
| 2002/0071136 A1 | 6/2002 | Bobrow et al. | |
| 2002/0073008 A1 | 6/2002 | Dutta | |
| 2002/0099735 A1 | 7/2002 | Schroeder et al. | |
| 2002/0112009 A1 | 8/2002 | Capers et al. | |
| 2002/0165817 A1 * | 11/2002 | Rackson et al. | 705/37 |
| 2002/0177453 A1 | 11/2002 | Chen et al. | |
| 2003/0065805 A1 | 4/2003 | Barnes | |

* cited by examiner

*Primary Examiner* — Lindsay M Maguire
*Assistant Examiner* — Hao Fu
(74) *Attorney, Agent, or Firm* — Law Office of Scott C. Harris, Inc.

(57) ABSTRACT

A system of using an interactive device such as an e-mail pager to obtain information from a publicly available source, such as the Internet. The e-mail pager may send information in its native format to a service that acts as an intermediary. That service takes the information and uses it to assemble a request to the actual information source, such as a Web page being accessed. If a web page is being accessed, the request is in HTML, and may include personal logon information. The response from the web page is also in HTML, and this information is received by the service, and salient information is taken from the HTML file. The information is reformatted, e.g. according to a template, into the e-mail pager"s native format, and sent to the pager. Another embodiment describes opening multiple pages, and assembling their content into a single web page.

31 Claims, 5 Drawing Sheets

WEB BASED COMMUNICATION OF INFORMATION WITH RECONFIGURABLE FORMAT

CROSS REFERENCE TO RELATED APPLICATIONS

This is a continuation of U.S. patent application Ser. No. 09/682,853 filed Oct. 24, 2001.

BACKGROUND OF INVENTION

The Internet is a very powerful tool for transferring and obtaining information. Many new applications have become available since the Internet's advent. Just to name a few, these include electronic placement of bids over the Internet, electronic determination of the user's bank balance over the Internet, automatic registration for various services over the Internet, electronic shopping with an electronic shopping cart, and various, virtually uncountable numbers, of others.

For all of the power of the Internet, it also has significant limitations. The language of the Internet, HTML in its various flavors, can only be properly interpreted by a device which is capable of reading HTML. Many different plug-ins and additional programs can be used, and are basically used as HTML windows. For example, the various flavors of Java, can enhance the Internet environment. Many companies have produced streaming video applications, such as shockwave and/or animation applications. These are basically shown as an associated application to the HTML.

Much of the customization which has been done on the Internet is done for the purpose of enabling more complexity, and more items to be shown over the Internet.

However, browsing from a hand-held device has become more popular. For example, the Internet can be browsed from a cellular phone, from a PDA such as a palm VII, or other thin clients. Typically the way in which this is done is by forming a special web page for those thin clients, which runs a scaled-down flavor of HTML that is optimized for such thin clients. Only those special web pages which are optimized in this way can be effectively viewed. For example, any attempt to use such a system to browse a normal, unoptimized web page, may cause an error, or may cause be information to be displayed in a way which makes it very difficult to effectively understand.

Other interactive hand-held devices, such as Blackberry devices and other devices which are optimized for e-mail and text messaging only, have no effective way to interact with the Internet. Therefore, while these devices are interactive in the sense that they can communicate and receive information via Internet-like channels, they can only receive information of a specified type.

SUMMARY OF INVENTION

The present application teaches a system of using an Internet-aware service to form a conduit between the Internet and another device which may be a hand-held device or any other thin client, or even a regular client.

In one embodiment, a client which is capable of interactive communication, and more preferably a hand-held device, may be used to obtain specified kinds of information from the Internet. Requests are sent to a service. The service can be any computer which is capable of receiving requests, reformatting then into a specified form that is required by a web server, sending it, receiving the response, and reformatting that response.

The service will typically receive requests in some kind of e-mail format, e.g. plain text. The service may return the responses to the requests in either plain text or some flavor of XML. The service can its self be a web server or any other kind of service, and the service carries out translation in a way that enables obtaining information from the Internet, retranslating it, and sending the information to the hand-held device.

In another embodiment, the hand-held device may include the user's personal information, and which can be used to allow identification, e.g. login, to a specified Internet site.

Another embodiment describes effectively do-it-yourself Internet, where a service is used to rearrange the content and information in an Internet page, and to display the new information to the user.

BRIEF DESCRIPTION OF DRAWINGS

These and other aspects will now be described in detail with reference to the accompanying drawings, wherein.

DETAILED DESCRIPTION

Figure 1:
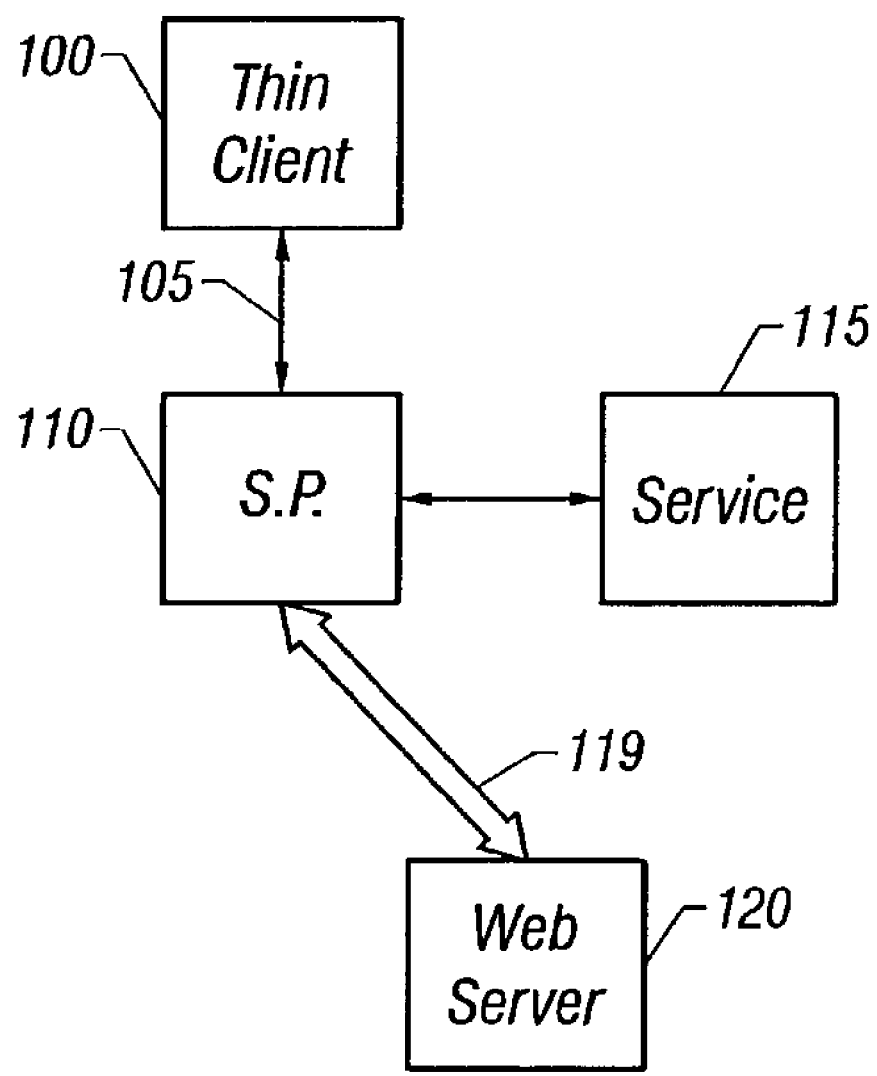
FIG. 1 shows a diagram of flow between devices according to an embodiment.

An overall flow of the communication between the various devices is shown in FIG. 1. According to the system of FIG. 1, a service is used to translate information between a hand-held device 100, and a web server 120. The web server 120 is connected to the Internet shown as 119, but more generally, can be connected to any publicly available source of information.

PDA/pager 100 can be any thin client which includes interactive capabilities. For example, it may be an e-mail pager, a cellular telephone, or any other device which is capable of interactively communicating. In one embodiment, the device may be limited to text messaging. The thin client 100 communicates as conventional over a channel 105 to a service provider shown generically as 110. The service provider can be, in the case of a cellular telephone, for example, a provider that operates as part of the cellular telephone system. The service provider also communicates with a service shown as 115. The service can be a conventional Web service or other subscription service, or simply can be an interfacing program that is running on a computer at the service provider's location. The service carries out certain translations, in order to communicate between the thin client, and the Web server 120. The service provider also includes a connection to the Internet, as conventional for such service providers, since they conventionally obtain information such as e-mail and Web content from the Internet.

While the embodiment describes the client 100 as being a "thin" client, it should be understood that this same flow can be carried out with other clients.

Figure 2:
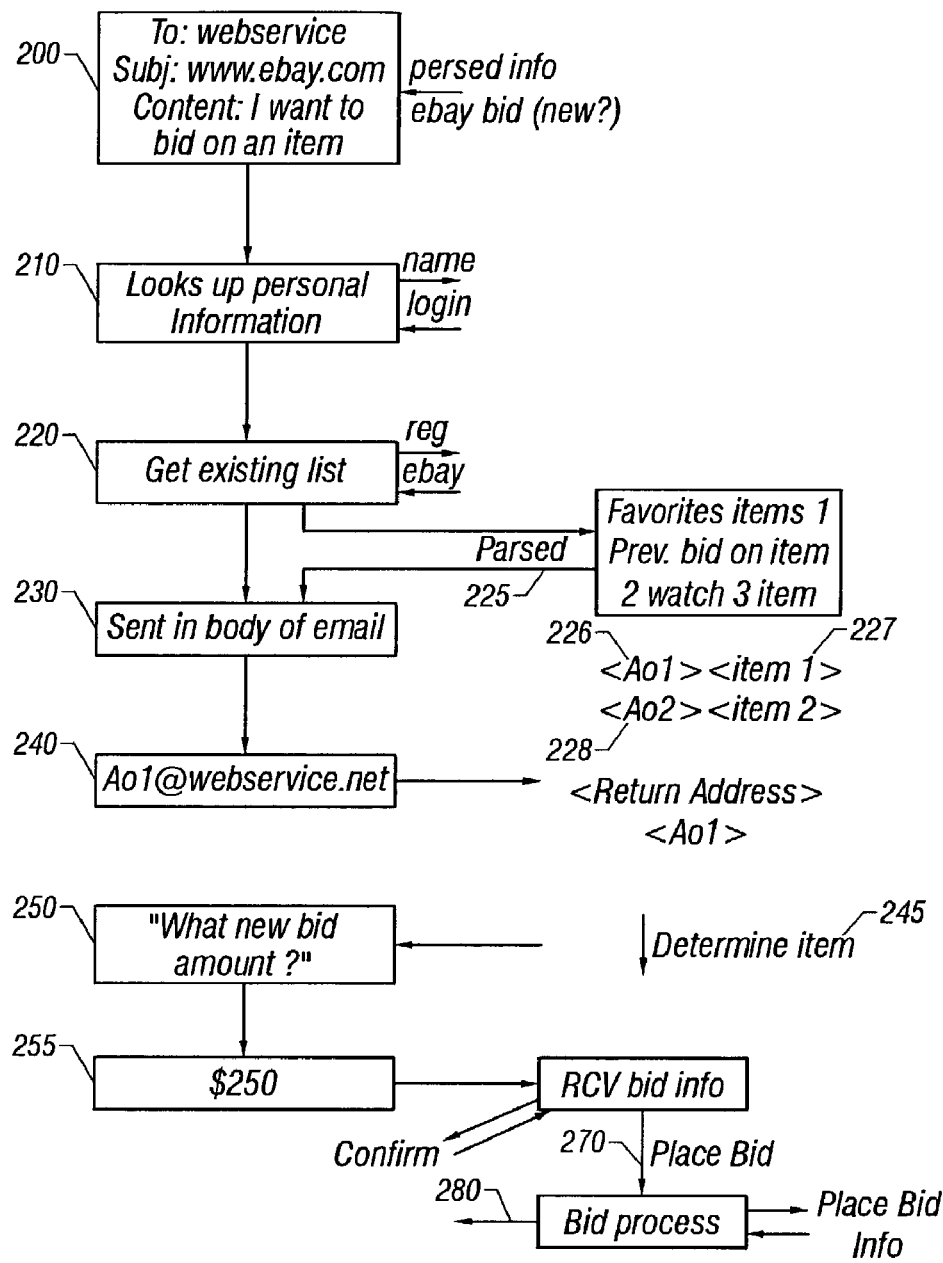
FIG. 2 shows a flowchart of an embodiment to query an auction type website using a service.
Figure 3:
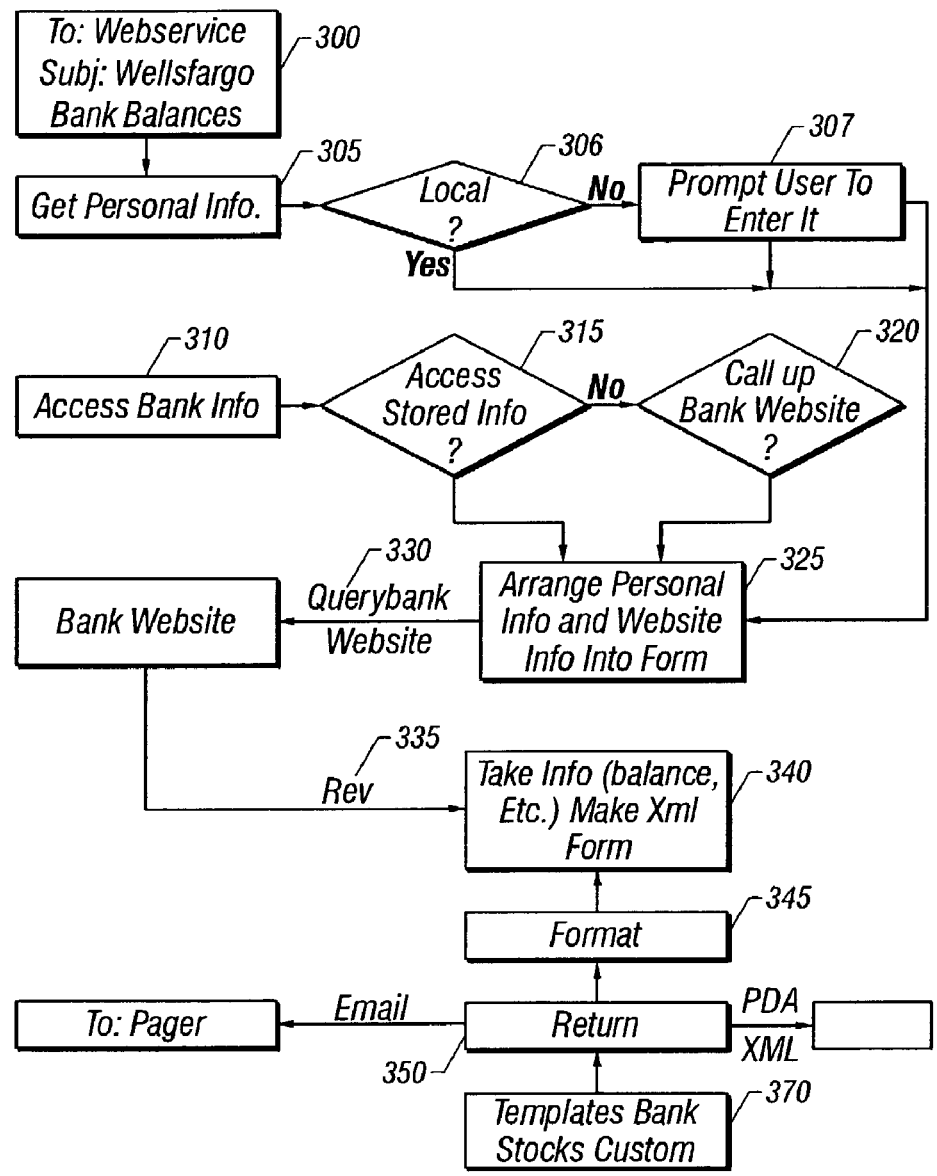
FIG. 3 shows a flowchart of operation to query a bank.

The operation of the system is shown in the flowchart of FIG. 2. FIG. 2 represents the flowchart for a system where the client 100 is an e-mail pager, and the system is being used to change or make a bid on an electronic auction site such as eBay. These same operations, however, would be carried out to exchange any kind of information with any kind of website.

At 200, the user makes the decision that they want to change or place an electronic bid. In order to its start the process, at 200 the user sends an e-mail to a special address, here called simply "Web Service" with content in either or both of the subject line and/or the body of the e-mail indicating the website and what the user wants. The detail may be written in plain English, and in this embodiment is parsed by a keyword recognition system. More generally, the system may parse the plain English words using any kind of plain English recognition system.

The keyword recognition system which is used herein takes advantage of the fact that only certain allowable operations may be carried out in this way. For example, the e-mail may be sent to a special address that only accepts e-mails about operations to be carried out by the service. Only a limited number of operations may be carried out, for example, specified Web sites, specified banks, stocks, and others.

Therefore, when the e-mail says "I want to place a bid on eBay", then the system can parse different words from this e-mail. First, it can easily match the word "eBay", and once doing that, it knows that there are only certain things that can be done on eBay. For example, a user may be allowed to browse eBay categories, do a search on eBay by keyword, check on a previously made bid, or make a bid.

By looking at the remainder of the keywords, once recognizing "eBay", and noting the categories above (browse, search, check bid, make bid, up a bid where I've been outbid), the system sees the word "bid". This again narrows down the options; the allowable things the user can do are either check on a bid or make a bid.

The system may store a number of different ways of saying each one. For example, the system may store "place a bid", "make a bid", "bid on", to represent the make a bid option. The system may store "check (on) bid", "bid status", "how is my bid doing", for the other. The system then tries to match the words of the email, to the words that correspond to one of the allowed actions. The best correspondence is selected, if possible.

Also stored within the database is a probability, for the specific user, of what they will want to do. This may be based on the user's previous actions. For example, the user may 77 percent of the time, want to place a bid when they use the word bid. The system may also store global statistics of this type, in case the user's specific statistics are not available. These statistics may be used when the system cannot determine exactly what to do, as a basis for an educated guess.

For any of these, the system returns an e-mail saying "you want to place a bid on eBay, is this correct"? The user replies with yes or no to indicate whether the system has properly understood the command. If the user answers no, then the system may return a numbered list of things the user can do, based on its parsing. The user can then reply with a number, for example.

At 210, the thin client, here a pager, looks up personal information that is stored within the pager database. For example, a PDA or other pager may include a storage repository for information. More generally, the client may be any interactive-capable client that is capable of sending and receiving information, and displaying results to a user. The send and receive need not be in real time; that is; the receive may be delayed relative to the send by some amount.

This information may be either local, or stored on an on-line server such as "www.myPalm.com" or other. Alternatively, if personal information is not stored, then an additional interactive operation can be carried out similar to those disclosed below. In any case, this operation returns the user's name, login information (such as password) and other registration information necessary for the specified site, here eBay.

The pager will request eBay for a list of its current status. At 220, the service sends an e-mail to the eBay site, asking for stored information. Note that this step is done totally independent of the thin client. The service itself is interacting with the website, and receiving information that will be later reformatted in order to send to the thin client. The existing list of current status is received from eBay, and parsed into its different parts. For example, the favorites list, the items previously bid on list and the watch list may all be included. If the user, under the "content" item, has specified more detail about what they want, then this may narrow down what is actually retrieved, in which case possibly less than all of this information may be accessed.

Other commands of this type may be, for example, "I want to bid on an item that is on my watchlist". This may be parsed to retrieve the contents of the watchlist. Alternatively, if the item says, "I want to bid on an item I've previously been outbid on", then the current bid list may be returned, or only items on the current bid list where the requesting party is not currently the winner.

Again, the information is requested by the service, and then received by the service. The service may parse and format this information in any desired way. Here, the service may parse the information at 225 into a text list, with each item having a special number that corresponds to a session ID. The number should preferably be a relatively short number, since the user will need to use this number to take further action on one of the items in the text list. In the embodiment shown, the session ID may be a01 referring to a first item, a02 referring to a second item, and so on. The actual content of the fields associated with item 1 may in fact be the description of the items, received from eBay. Similarly, other item numbers such as a03 may be provided. This list, again in text form, is sent as the body of an e-mail to the e-mail pager at 230. This embodiment describes using alphanumerics to describe the items, providing approximately $50^3$ different possibilities. This may be far more than will ever be necessary, so long as the return address can be used to determine which session is being referred to.

Again, each item has a number. In order to select one of these numbers, the user sends an e-mail back to the Web service. This can be a reply to the previously-sent e-mail, or can be simply sent to an address related to numbers in the previously-sent e-mail. For example, the e-mail may be sent to the address IDnumber@Webservice.net, here this may be the specific ID number a01 being used. The web server looks at the return address, to determine the meaning of the session ID. With the return address, and the session ID, the web service can unambiguously determine the item to be bid on. From this, the web service determines the item at 245, and again sends an e-mail to the user requesting further details.

As part of the information received at 220, the Web service may receive existing bid amounts and other details necessary for placing the bid. The system might not have reported that information previously, but may still store it. Alternatively, this can be individually determined at 245.

Having gotten to this point, and the user selecting an item where a bid was made but now is no longer the highest bid, the system may conclude that the user intends to up their bid. An e-mail is sent back to the pager at 250 that simply says "what new bid amount?" The user responds with a dollar number at 255 which is again sent to the Web service. The Web service again receives this number, which may or may not include the session ID number (here a01) in be subject line. This tells the Web service that the user wants to place a bid of $xxx on the item number a01. The Web service now has all it needs it knows the item, the amount, and the user's personal identification information. An optional confirmation may be carried out at 260 where the Web service says "are you sure you want to place a bid of $xxx on <item one>?", and waits for a yes or no by e-mail. If so, the system places the bid at 270 with eBay, and once receiving confirmation that the bid has been placed, reports that confirmation at 280.

On the eBay site, simply placing the bid does not mean that your bid is necessarily high enough. For example, the bid of xxx might not be higher then existing bids which already exist in the system. Therefore, the results of the bid, such as bid high enough or bid not high enough are reported at 280. This may be simply reported as "you are the current high bidder" or your bid has been placed but was not high enough.

The service may also carry out other functions once the bid is placed in this way. For example, the service may monitor eBay at increments of say 5 minutes, 15 minutes, or one hour, looking for outbid notifications. Since the operation is carried out with the server, other timed services may also be carried out. For example, the user may send the service a message saying "check the bid at every five minute intervals, and report to me." The system can parse this out based on any real time is to parsing system, and decide what it's been told. The server can easily check the bid every five minutes, and send an e-mail to the users interactive device.

Again, since the service is running on a computer, any function that can be programmed in any language can also be carried out. Therefore, the message sent to the service can be much more complex. For example, the message can say "check the bid at every five minute intervals, and report to me only if the bid has changed." Any different combination of possibilities can also be programmed in this way. An advantage is that all of the user interface is carried out using plain text operations.

The above has described placing a bid on ebay, but it should be understood that this system can also be used for many other purposes, including buying virtually any product on the Internet or others. Another example is for using this system to check on stock prices. An example command that could be sent to the service says "check on my usual stocks today, and report to me if any of them changed by more than 5 percent". A list of usual stocks can be stored in either the service or in the interactive device. The service can check on these for example at 10 minute intervals, and report by e-mail only those stocks which have changed. This shows the power of the format conversion system used by the present system. Rather than point and click, this system allows effectively plain language commands to be made.

An important advantage is allowed by the service that carries out the translation between the client and the actual web server that has the information. By providing this server, the client can access any source of information over any publicly available network, without actually having a device that can access the server.

Another embodiment is disclosed herein of using this system to obtain a bank balance over the Internet. In this embodiment, the operation is shown for use with either a text based device such as an e-mail pager, or with a device that is capable of Internet browsing.

At 300, an initial e-mail is sent to the Web service, the subject being bank balance. The system obtains the user's personal information at 305. This can be personal information that is already stored in the device, or entered information. At 306, the system determines if the information is stored locally, and if so flow continues. If not, the user is prompted to enter this information at 307.

At 310, the bank information is accessed, by the service accessing the web page associated with the bank. In order to obtain a bank balance, the user must send specialized information to the bank using their specialized web page. The web page may be stored, as a cached web page, and if so it is accessed at 315. If the web page is not stored at 315, the bank's website is called up at 320. In either case, the result is the web page, and the user's personal information such as account numbers, passwords and the like. The term "password" as used throughout this specification may include any personal identifying information including a password, a personal identification number, or some other identifying information.

At 325, the Web service arranges all of this, that is the personal information and the web page information, into a form of the specified type and sends this form to query the bank's website at 330. The bank's website once queried at 330, returns the desired information at 335. Presumably the desired information is on the first page returned, although the process can be continued multiple times if an additional page of information is necessary.

At 340 the received information is obtained in the HTML form and is reformatted into an XML form. A desired format for the XML form is applied at 345, which will be returned at 350. If the returning is to a text based device, control passes to the left in the flowchart, and text information is sent in a specified form. If the returning is to a browser type device, such as a PDA or a full-blown computer, control passes to the right in the flowchart, and the information may be sent in an XML form.

Figure 5:
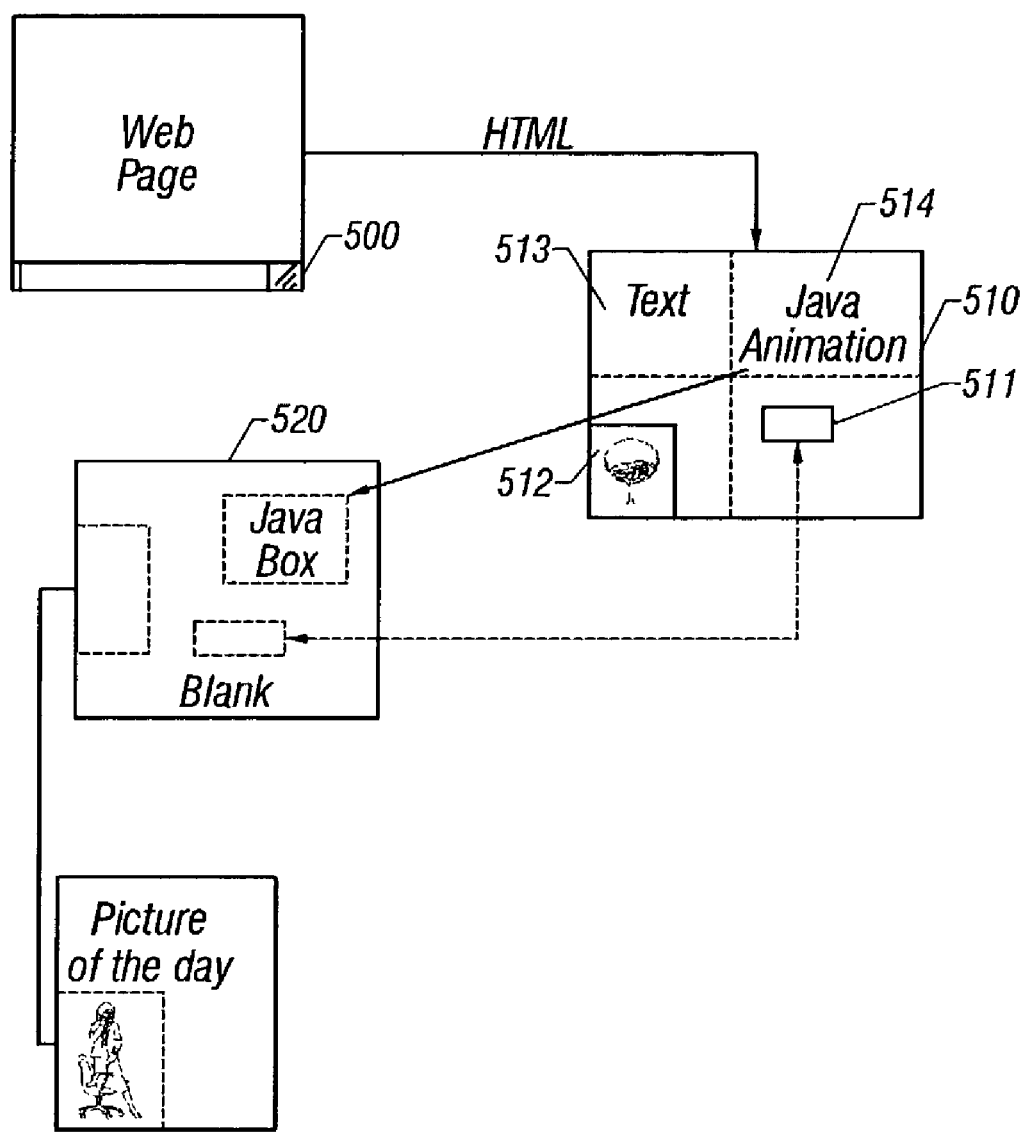
FIG. 5 shows a system of do it yourself formatting of internet content.

Information for both of the returned forms may be stored in the templates 370. Various forms of specified templates may be stored. For example, a template for a bank may be stored, for stocks, and also custom templates. Each of the templates describes the preferred format for the way in which information is returned. The template may be very simple; for example, for a bank the template may simply say "your balance is xxx, of which yyy is available balance". The variables in these templates may be filled in from the information obtained from the Internet site. The embodiment disclosed with reference to FIG. 5 shows how custom templates can be made.

Since this system obtains the raw information and formats it according to a template, a limited form Internet browsing device such as a PDA can effectively browser virtually any site, even those sites which are not available in reduced bandwidth/information versions. The effective or desired information on those sites is located. That information may be conveyed to the user as part of one of the forms/templates.

Figure 4:
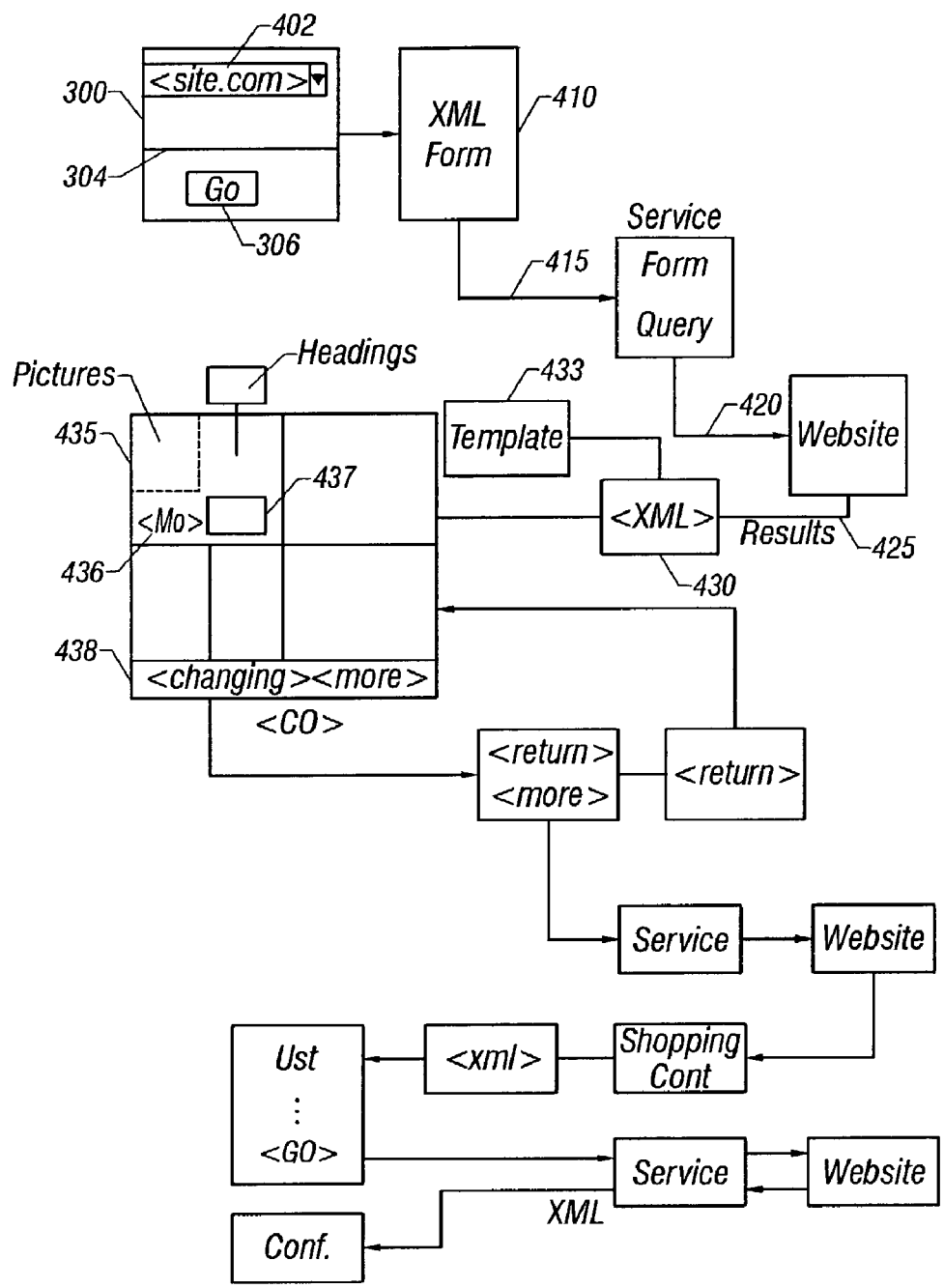
FIG. 4 shows a flowchart of using this system with a general ecommerce site.

Another embodiment, shown with reference to FIG. 4, is more optimized for use in a browsing type PDA, and can be used with the same features to carry out electronic shopping such as with a shopping basket on a site. Many of the general principles described above can be used. A generalized shopping form is shown as 400 includes the site name, which can be selectable from a list 402. The user selects the site name from the list, or types in their own desired site name. The user then types in the search term and then actuates the execute key 406. This causes the PDA to form the information into an XML (or HTML) form at 410. The XML form is sent to the service at 415, which translates the form into a query in a format that emulates the user requesting specified information from the specified website. This query is sent to the specified website at 420. The website then returns results at 425. These results are again parsed into an XML form at 430, using one of the specified templates shown as 433. For purchasing an object, the template may be of the general form shown as 435 where one, two or four objects are located on the screen with reduced size pictures of each, the heading information for each, and the rest of the information for the object simply contained in an XML link marked <more> shown as link 436. If the user selects the "more" link, then additional information that was downloaded from the website is returned. Each returned page will similarly have a "more" link until reaching the last page at which only the "return" link is shown. The return link returns the user to the basic view 435. In any of the objects, main view, an "add to cart" icon 437 may also be viewed. In this embodiment, along the bottom of the view, a toolbar 438 allows selecting more results or changing the view. The changing the view for example may select a different format from the templates. Selecting this different format causes all further actions for the similar kind of site to be carried out using the new selected format.

The user can also signify checkout in the toolbar. When the user signifies checkout, the information from the service representing the simulated shopping cart is sent to the website, initiating the checkout process. The website may return conventional shopping cart information at 442, which is again parsed in an XML format at 444 into a list 446 that can be more easily displayed on the handheld. When the user signifies go, (448) all of the user's personal information is transmitted at 450 to the service, e.g. information already stored in the handheld. Alternatively, the user may be prompted for this information. The service sends the information to the website at 452, which confirms the buy. The confirmation is returned to the service at 454, converted to an XML form at 455, formatted and sent back as a confirmation 456.

FIG. 5 shows yet another alternative system which is usable not only in thin clients but also in relatively more powerful clients. In this embodiment, a web page may be customized by a user. The web page customization software may effectively be a plug-in to the HTML reader that places a toolbar at the bottom. One item on this toolbar is a customized link shown as 500. Upon executing the customized link 500, the computer that is running the software analyzes the HTML page and parses it into different parts 510 shows how the different parts of the page may be parsed separately. The parsed portions may include for example fill in values such as 511, drawing parts such as 512, and fixed text such as 513 as well as plug-ins, e.g. Java or animations shown as 514. The system also brings out a blank page which may be located side-by-side with the parsed page, or may be located in a separate window. In this embodiment, each HTML object may be separately selected and moved. For example, if the variable 511 includes information such as a bank balance, the user can select this with their cursor, and drag it, as shown, to a desired area on the blank page. This makes an XML form which includes information from the other page. Any number of web pages can be combined together to form the different composite parts of the composite web page 520.

The composite web page may be continually updated. In order to obtain any of the various parts, the system may call up the original web page that produced the part, obtain the web page, take the portion of the web page corresponding to the selected part, and form the composite web page for eventual display. All of this may be done in the background. For example, the system may open all of these pages as real windows in the background, view the source, find the right part, import the right part, and then close the windows once the composite web page has been formed.

What this means, therefore, is that a number of windows may be dynamically opened, as background windows. Once the system has obtained the desired parts from those windows, they may be automatically close, with only the desired part being displayed on the composite page.

Effectively this provides do-it-yourself Internet, where parts of an HTML page are obtained, and those parts are used to form a composite form which is eventually displayed. In this embodiment, the composite form may be in XML, since that is easy to configure.

Although only a few embodiments have been disclosed in detail above, other modifications are possible. For example, the above has disclosed only certain limited kinds of thin clients. It should be understood that other clients, including personal computers, may be used.

The above has described the client being a machine such as a pager or the like. However, these same techniques may be carried out over a voice telephone type network. For the example, the user may enter their information either by touch-tone keys, or by voice recognition. Systems of obtaining information from a telephone are well-known, such as bank by telephone type systems. Again, however, and analogously to the above, all of these require that be banks network have installed characteristics. In the present system, the telephone communication is with the equivalent of the service, who places a query to the bank or website. The website or bank must have some capability of being accessed. However, by using this service, the user can call, and using voice prompts and voice commands place a bid on eBay, obtain a bank balance, or anything else like that.

This system may also be used for obtaining many other kinds of information, basically too innumerable to specifically recite herein. For example, this system may be used to obtain current news stories, by sending the service a query "what are the top news stories?". Any kind of query of this type may be answered.

All such embodiments are intended to be encompassed within the following claims.

The invention claimed is:

1. A system, comprising:
a web server, including a computer processor, producing a web page which is available on the Internet, wherein said web server interacts with remote users over the Internet; and
an information determining part associated with said web server which receives an email and obtains information from said e-mail, said information being in a form which can interact with said web page being produced by said web server;
wherein said information determining part recognizing at least one word in said emails, to determine automatically a desired action of said email, wherein said server hosts auctions of items for sale and maintains auction bids for items for sale and wherein said information determining part also sends e-mails that include information about items in said auctions for sale over the Internet, wherein said information determining part produces and sends messages which include a session identification indicator that identifies auction information, and that where said session identification indicator is a unique value that unambiguously represents an item in said auction information,
and wherein said information determining part also stores probabilities of what users are likely to be requesting by said email, based on previous actions, and wherein said information determining part uses said probabilities, and uses said at least one word that was recognized, to determine an action to take based on said email.

2. The system as in claim 1, wherein said e-mails include information in plain text form.

3. The system as in claim 1, further comprising an e-mail pager, producing said emails.

4. The system as in claim 1, further comprising a cellular telephone, producing said emails.

5. The system as in claim 1, wherein said information determining part receives and translates a user ID and password as part of said emails.

6. The system as in claim 1, wherein said e-mails include information about items in said auctions for sale over the Internet, on which items a user has been outbid.

7. The system as in claim 6, wherein said information determining part automatically recognizes phrases that include the word "bid" in said email as one of said words and where said action is a bid on one said items for sale over the Internet.

8. The system as in claim 6, wherein said information determining part also sends e-mail messages indicative of information about said auctions.

9. The system as in claim 6, wherein said information determining part automatically detects a new bid amount as part of a sent message.

10. The system as in claim 6, wherein said information determining part detects a reply to a plain text message which reply including said session identification indicator, and takes action on a specified auction based on said session identification indicator.

11. The system as in claim 1, wherein said information determining part stores probabilities related to a specific user and uses said probabilities to determine said action.

12. The system as in claim 1, wherein said information determining part stores said probabilities related to a combination of actions taken by all of the number of users, and uses said probabilities to determine said action.

13. The system as in claim 1, wherein said information determining part also sends emails indicative of actions occurring on said web page.

14. A system comprising:
a web server, including a computer processor producing a web page which is available on the Internet, wherein said web server is a server that hosts auctions of items for sale and maintains auction bids for items for sale over the Internet; and
an information determining part associated with said web server which receives e-mail messages and obtains information from said e-mail messages, said information being in a form which can interact with said web page being produced by said web server;
wherein said information determining part having a keyword recognition system which recognizes at least one word in at least one of the email messages to determine automatically a desired action of said email messages,
and wherein said information determining part also sends e-mail messages that include information about items in said auctions for sale over the Internet, on which items a user has been outbid, wherein said information determining part also sends e-mail messages indicative of actions occurring on said web page, wherein said e-mail messages include a session ID indicative of said actions where said session ID is a unique value, that unambiguously represents an item in said auction,
and wherein said information determining part also stores probabilities of what users are likely to be requesting by said email messages, based on previous actions, and wherein said information determining part uses said probabilities, and uses said at least one word that was recognized, to determine an action to take based on said email messages.

15. The system as in claim 14, wherein said session ID is included as part of a return address in the e-mail message.

16. The system as in claim 14, wherein said email messages include multiple different session IDs.

17. The system as in claim 14, wherein said action includes placing a new bid.

18. A bid accepting system, comprising:
a computer processor running a web page that is connected to the Internet, wherein said web page and said server hosts Internet based auctions; and
said web page accepting bids on items on the Internet based auction; and
said server checking at predetermined intervals, for a specific item, whether there are new bids on said specific item, and said server not checking for new bids at times between said predetermined intervals and said server automatically reporting to a specific user when there are new bids on said specific item,
said computer processor receiving a first e-mail message, which e-mail has instructions to interact with said web page;
said computer processor, using a keyword recognition system to automatically recognize at least one word in the first email message, to determine automatically a desired action of said first email message and to determine said action based on said at least one word, wherein said at least one word comprises a word that instructs said bids, wherein said first e-mail message includes a session ID indicative of an individual auction on said web page, where said session ID is a unique value, that unambiguously represents one of said individual auctions;
and wherein said computer processor stores probabilities of what users are likely to be requesting via said first email message, based on previous actions, and wherein said computer processor uses said probabilities, and uses said at least one word that was recognized, to determine an action to take based on said first email message.

19. A system as in claim 18, wherein said intervals are set by a user and can be changed by the user.

20. A system as in claim 19, wherein said intervals are set by the user based on an e-mail command, and said server reports via e-mail if there are new bids on said item.

21. A system as in claim 18, wherein said keyword recognition system automatically recognizes phrases that include the word "bid" in said email as one of said words.

22. A system as in claim 21, further comprising replying to said first e-mail message with instructions to increase a bid.

23. A system as in claim 18, wherein said first e-mail message includes session ID information that represents an individual auction on which said user has been previously outbid, where said session ID is a unique value, that unambiguously represents one of said individual auctions.

24. A system as in claim 23, wherein said server receives a reply to said e-mail message with said session ID information, and modifies a bid on said web page responsive to said reply.

25. A system as in claim 24, wherein said session ID is part of a return address for said e-mail.

26. A system as in claim 24, wherein said reply specifies an amount of a bid to be placed.

27. A system as in claim 20, wherein an e-mail message includes a session ID indicative of an individual item on said web page, and where said session ID is a unique value, that unambiguously represents said individual item.

28. A system as in claim 18, wherein said server receives a second e-mail that has instructions on a specific interaction with said web page.

29. A system, comprising:
- a computer processor running a web server, producing a web page which is available on the Internet, wherein said web server produces a web page that hosts auctions of items for sale and maintains auction bids for items for sale over the Internet; and
- an information determining part associated with said web server which receives e-mail messages and automatically determines information from said e-mail messages in a form which can interact with said auctions on said web page being produced by said web server;
- wherein said information determining part having a keyword recognition system which recognizes at least phrases that include the word "bid" in an email message to determine automatically that a bid action is being requested by said email, and automatically provides information about said bid action to said web server, wherein said web server also accepts a bid based on said information about said bid action, wherein said information determining part and sends messages which include a session identification indicator that identifies auction information, and that where said session identification indicator is a unique value, that unambiguously represents an item in said auction information, and wherein said information determining part also stores probabilities of what users are likely to be requesting by said email messages, based on previous actions, and wherein said information determining part uses said probabilities, and uses said at least one word that was recognized, to determine an action to take based on said email messages.

30. The system as in claim 29, wherein said session identification indicator is included as part of a return address in the e-mail message.

31. The system as in claim 29, wherein said session identification indicator is included as indicators that include both alphabetic and numeric information in the email.

* * * * *